United States Patent [19]
Lapeyre

[11] 3,980,527
[45] Sept. 14, 1976

[54] DISTILLATION SYSTEM HAVING BOUYANT ROTARY HELICAL CONVERSION MEANS

[75] Inventor: James M. Lapeyre, New Orleans, La.

[73] Assignee: The Laitram Corporation, New Orleans, La.

[22] Filed: June 25, 1973

[21] Appl. No.: 373,441

Related U.S. Application Data
[63] Continuation-in-part of Ser. No. 148,775, June 1, 1971, abandoned.

[52] U.S. Cl. ............................... 202/175; 203/25; 203/10; 203/100; 203/DIG. 20
[51] Int. Cl.² ........................ B01D 3/00; B01D 3/14
[58] Field of Search ........ 203/10, 11, 100, DIG. 17, 203/DIG. 20, 24, 26; 202/176, 174, 175, 173, 166, 167, 165, 163, 182, 234, 235; 60/495–507

[56] References Cited
UNITED STATES PATENTS

| | | | |
|---|---|---|---|
| 1,026,450 | 5/1912 | Neal | 60/504 |
| 1,544,031 | 6/1925 | Polleys | 60/504 |
| 3,127,330 | 3/1964 | Katz | 203/11 |
| 3,468,762 | 9/1969 | Klitzsch | 203/10 X |
| 3,677,905 | 7/1972 | Brown | 202/174 |

*Primary Examiner*—Norman Yudkoff
*Assistant Examiner*—Darrell Sanders
*Attorney, Agent, or Firm*—Schiller & Pandiscio

[57] ABSTRACT

Apparatus for manufacturing fresh water which utilizes the energy of surface waves in an ocean, and comprises a buoyant helical member mounted for rotation about an axis. The pitch of the helical member approximates the length of the expected waves and the member is floated on the surface with its axis oriented so that each wave traverses the helix lengthwise and buoyantly supports successive sections thereof causing it to rotate about its axis. The helix is coupled with transducer means for using the rotational energy of the helix to distill the sea water. The ocean is used also as a cooling medium in the distillation process.

8 Claims, 4 Drawing Figures

JAMES M. LAPEYRE
INVENTOR.
BY
Schiller & Pandiscio
ATTORNEYS.

DISTILLATION SYSTEM HAVING BOUYANT ROTARY HELICAL CONVERSION MEANS

This appliction is a continuation-in-part of U.S. application, Ser. No. 148,775, filed June 1, 1971 now abandoned.

The present invention is concerned with conversion of the energy of ocean waves into useful power and particularly to apparatus and method for utilizing the energy of ocean waves to manufacture fresh water.

With the growing environmental problem of pollution of our fresh water streams, lakes and rivers, it has become increasingly important to be able to manufacture large quantities of fresh water both efficiently as well as economically. Since the oceans cover approximately three-quarters of the earth's surface, efforts have been made to develop methods of manufacturing fresh water from salt water. As a consequence many processes have been suggested and investigated. For convenience these processes may be classified into those that separate the water from a concentrated brine and those that remove the salt from the water. The former include distillation, freezing, osmosis, and solvent extraction; while the latter include ion exchange and electrodialysis. Of these processes, distillation has received a great deal of attention.

The process of distillation involves conversion of the water in a salt solution into vapor and subsequent condensation of the vapor to form fresh water. This process can be carried out with a number of different apparatus.

One apparatus is the single-effect evaporator. This is an apparatus comprising a single boiler which is filled with brine. The brine is heated to a high temperature to promote formation of water vapor. The water vapor is directed from the boiler through a condenser wherein the water is cooled to produce fresh water. A basic requirement for operating the single-effect evaporator is a good source of heat. It has been estimated that, for this type of evaporator, the heat transfer required to manufacture 1000 gallons of fresh water is $8.5 \times 10^6$ B.T.U. Even though the heat needs to be degraded only a few degrees by the process, it has been difficult to develop systems that are thermodynamically efficient. The utilization of conventional fuel supplies using the heat on a once through basis have made the cost of the water manufactured by a single-effect evaporator almost prohibitive. Also, use of conventional fuels can aid in further polluting the waters as well as the atmosphere. As a result, efforts have been made to improve the efficiency of fuel utilization and accordingly reduce the economic as well as environmental costs of distillation.

One train of thought has been to re-use the heat and thereby improve the efficiency of the system. Two major processes in which the heat of the system is re-used are multistage evaporation and vapor compression evaporation.

Multistage evaporation operates on the principle that because a single-effect evaporator degrades the heat by only a few degrees, the heat can be successively re-used in units operating at lower temperatures. A multistage evaporator which operates on this principle is in reality several single-effect evaporators of stages connected in a serial arrangement. Typically each of the stages is filled with brine. Steam at an initial starting temperature is transmitted from a boiler through pipes in the first stage where it will heat the brine. The vapor formed in the first stage which is at a temperature several degrees less than the starting temperature of the initial steam, is transmitted through an exchanger to heat brine in the second stage. The vapor formed in the second stage, which is at a temperature several degrees less than the temperature of the vapor of the first stage, is transmitted through a heat exchanger in the third stage. The process continues for the number of stages desired. Although this system is thermodynamically more efficient than the single-effect evaporator system, equipment costs are increased. Additionally, the operation of a multistage evaporator requires the use of conventional fuel supplies which serve as a source of pollution.

Vapor compression evaporation also operates on the principle that the temperature drop across the evaporator may be small. This type of process, used in the Kleinschmidt still, compresses the vapor produced above brine in an evaporator, and thus raises the temperature of the vapor several degrees. The compressed vapor is then transmitted through an exchanger in order to heat the brine. As a result the net energy required is that needed initially to heat the brine to its operating temperature and to drive the compressor. The energy required to operate the compressor is dependent on the temperature difference between the vapor issued from the evaporator and the temperature of the vapor after it is compressed. The costs involved to run such a compressor have made vapor compression evaporation more feasible than multi-effect evaporation for small operations but less feasible for large operations. For large operations, a large compressor is required increasing the amount of energy required.

In summary, all the distillation processes mentioned require energy to bring the particular apparatus to operating temperatures and energy to keep the apparatus operating at those temperatures. The use of conventional fuel supplies used to provide this energy has been costly, both economically as well as environmentally.

It is apparent that one of the major problems in the manufacturing of fresh water by a distillation process has been the need for a large and substantially constant source of energy which will substantially decrease present economic and environmental costs.

It is well known that a tremendous and practically inexhaustible source of energy is to be found in wind-driven surface waves. It has been suggested that it might be economically feasible to construct apparatus for converting the available wave energy to a more useful form such as electricity. Surface waves in water may be termed "gravity waves" and while the waves move horizontally at substantial speeds; e.g. as high as thirty knots, the motion of the water itself is essentially circular or elliptical, except when the wave is caused to break. Wave energy conversion systems employed heretofore have utilized the vertical component of the water motion and/or water movement associated with breaking waves. Such systems are generally intermittent in their operation and/or have variable energy outputs, while the tremendous wave forces involved, particularly those encountered during storms or as a result of seismic disturbances, have necessitated very substantial and expensive structures.

Another characteristic of ocean waves is their period or wavelength which, over extended periods of time, may, in many locations, deviate only slightly from a particular value. This is significant because it has made possible the achievement of a primary object of the present invention, namely, the provision of a wave energy converter adapted to operate continuously and provide a continuous and substantially constant energy output.

More specific objects of the invention are to provide a clean and inexpensive constant source of energy in order to manufacture fresh water, to provide apparatus and method for utilizing wave energy to manufacture fresh water and to provide apparatus and method for manufacturing fresh water from salt water in which the salt water is not only used as the source for the fresh water but also as the energy source for bringing distilling apparatus to the initial operating temperatures and to maintain the apparatus at those temperatures.

To effect the foregoing and other objects, the present invention generally comprises a wave conversion system, preferably a buoyant helical member mounted for rotation about its helical axis and adapted to be positioned such that the helical axis is oriented approximately along the mean direction of propagation of the waves. The helical member is coupled to a driven system, such as a friction boiler or a compressor system, for producing fresh water directly from brine.

Other objects of the invention will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
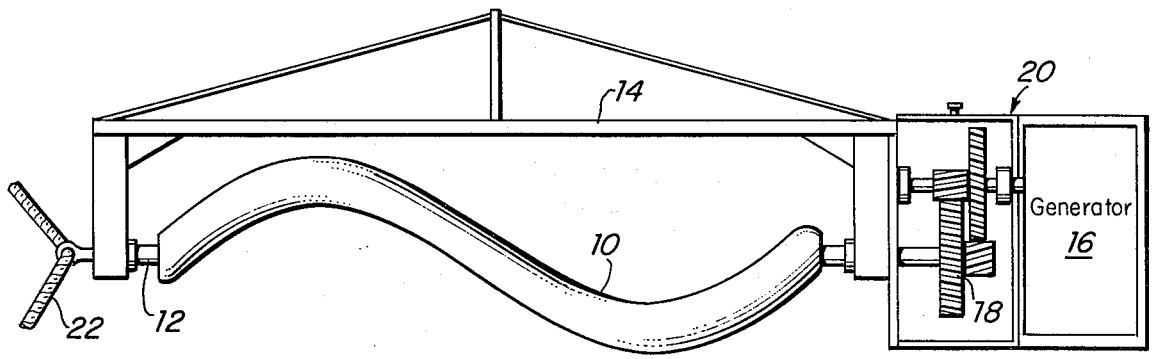
FIG. 1 is a somewhat schematic, elevational view, partially in section, and partially in perspective, illustrating a wave energy converter embodying the invention.

The wave energy converter of the invention is shown in the drawing as comprising means adapted to be rotated directly by ocean waves and means for converting rotary motion to heat and for distilling water coupled with the wave rotated means and adapted to be driven thereby. The rotary, wave-driven means include an elongated buoyant member 10 in the form of a helix mounted for rotation about the axis of the helix. Buoyant helical member 10 is constructed so as to displace only a small portion of its volume and may comprise, for example a tube or it may be formed of a material such as one of the expanded polymers, having a relatively low specific gravity. Member 10 may be self-supporting and rotatably mounted at its ends as shown in FIG. 1 or the helical member, designated 11 in FIG. 2 may be coiled around a supporting shaft 12 and supported at regular intervals throughout its length.

As previously noted, over extended periods of time, the waves approaching a shore may be characterized by a substantially constant period and approach from substantially the same direction. If the period is known or can be predicted accurately, then the wave length and wave velocity are readily computed, being functions of the wave period. For example, it is not unusual to encounter waves having a period of ten seconds which means that the waves travel at a velocity of about 30 knots or 50 feet per second and have a length of the order of 5 hundred feet. The helical buoyant member 10 is designed to float on the surface of the water while oriented with its helical axis in the direction of wave propagation such that each wave traverses the helical member from end to end buoyantly supporting successive sections of the helical member.

Figure 3:
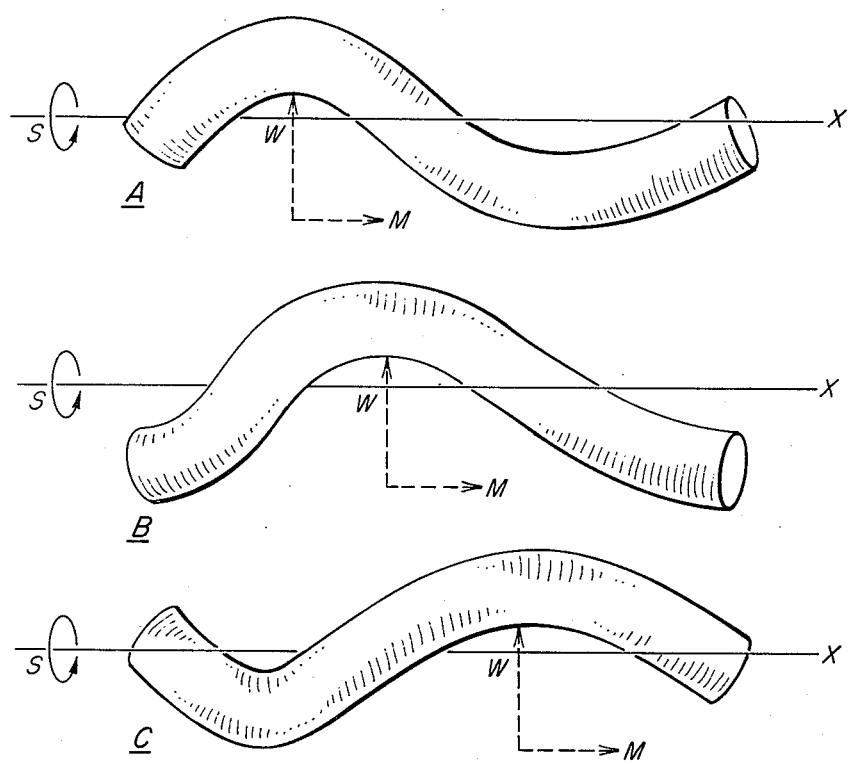
FIG. 3 is a series of views illustrating operation of a buoyant helix of the invention.

In FIG. 3, there are three successive idealized views A, B, and C, of a helix rotated about an axis X by a wave according to the present invention. In each view, the position of the wave crest is indicated by the broken arrow marked W, the direction of wave propagation is indicated by the broken arrow marked M, and the direction of shaft rotation is indicated by the arrow marked S. It should be noted that as the wave crest progresses from left to right successively from the position shown in view A, to that shown in view B, to finally that shown in View C, the motion of the wave along M raises successive portions of the helical member, causing it to rotate about axis X.

In the preferred embodiment of the apparatus of the invention, the pitch (length of a 360° section) of the helix will be at least approximately equal to the length of the expected waves and will be at least 360° in length. By virtue of this construction, rotation of the helical member will be continuous since a wave will start to transverse the helix immediately as the preceding wave has finished transversing the helix and successive waves will act on sections of the helix spaced 360° apart (the pitch length) so that the two lifting forces, converted into torque by the helical member, act simultaneously and in the same direction.

Figure 2:
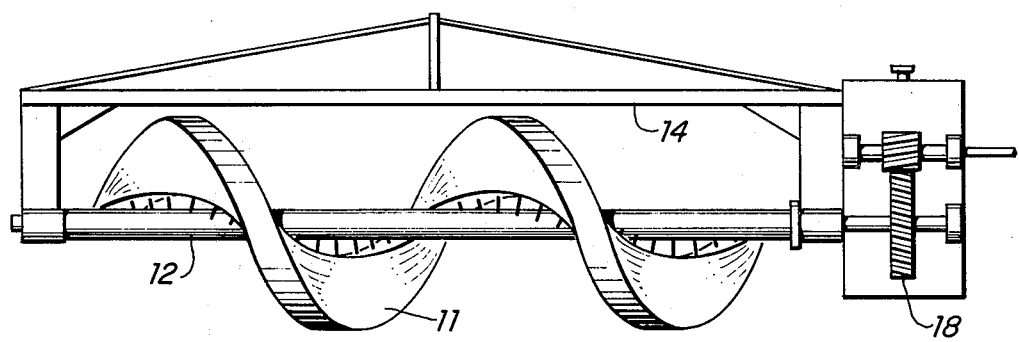
FIG. 2 shows another embodiment of a buoyant helix adapted for incorporation in the apparatus of the invention.

The buoyant helical member may have any convenience cross-section such as circular as shown in FIG. 1, or rectangular as shown in FIG. 2. However, it is important that the helical member have a substantially uniform cross section or buoyancy, throughout at least 360° of its length so that the torsional component of the force exerted on the helix by each wave remains substantially constant as the wave traverses the helix. In this way, rotation of the helical member will be at substantially constant speed as well as continuous, thus making the apparatus more ideally suited for driving means, such as an electrical generator, required to be driven continuously and at constant speed. The end sections of the helical member may be rounded or tapered to promote smoother flow of the waves as they start and finish traversing the helix.

The other components of the apparatus include means for mounting the helical member for rotation about its axis. These means include a frame or supporting truss 14 in which are journaled shafts Section 12 extending from the ends of helical member 10, as shown in FIG. 1, or shaft 12 (shown in FIG. 2) on which helical member 11 is supported.

In an alternative embodiment (not shown), the supporting truss may be eliminated and the helical member mounted for rotation at only one end. For maximum coupling of the helical member to the surface waves, the buoyancy of the helix should be adjusted (by selection of materials, structural weighting or the like) so that in a calm sea, the helical member floats with one-half above water and the other half submerged, the helical axis thus lying in the plane of the water surface. With such a structure, the helical axis will remain near water level for waves of substantial amplitude. If the helical member were either so light that it rode almost completely on the wave crests or so heavy that it were neutrally buoyant and rode completely submerged just below the wave crests, it will be seen that no torque will be produced. The fifty percent buoyant condition is halfway between these extremes and gives maximum torque and power output.

The driven energy conversion components of the wave energy converter include converter system shown generally at 16 for directly converting the rotational energy of the helix to heat energy and for distilling water with such heat. System 16 is coupled with the helix through a suitable transmission including, for example, speed-up gears 18. Converter system 16 and gears or other rotary driven means are mounted and enclosed in a water-tight, buoyant housing 20 connected to supporting truss 14 or adapted itself to function as a support for one end of the helical member. Thus, the helical member, the supporting truss and the driven components may be constructed as a buoyant unit that can be moved through the water as any vessel. This permits the converter to be positioned in the most favorable location, oriented as required with respect to the direction of wave travel and moved to a safe place to avoid damage in the event of a storm or other disturbance.

Figure 4:
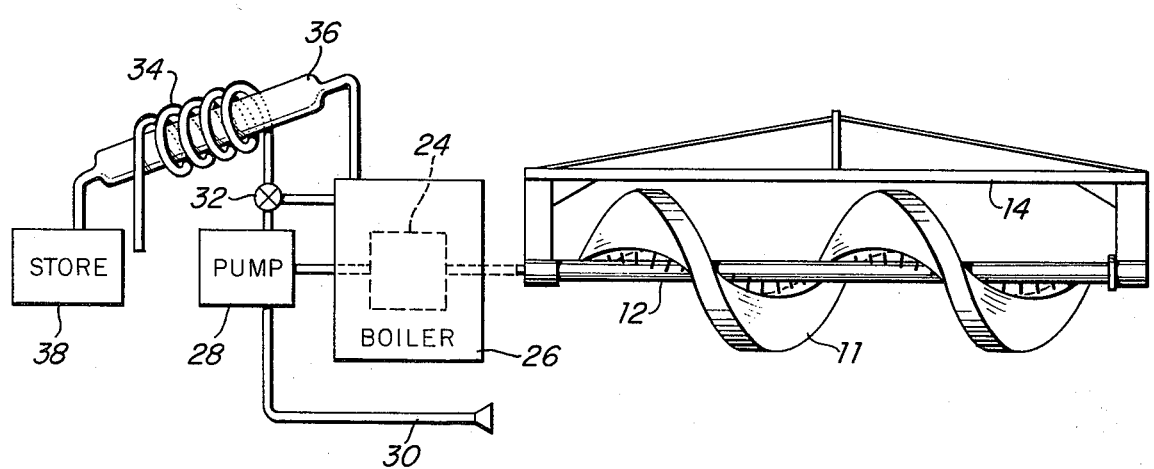
FIG. 4 is a schematic representation showing one embodiment of a system for producing fresh water using the wave energy converter.

One embodiment of system 16 including a rotation-to-heat converter and distillation unit is shown schematically in FIG. 4 as a single-effect evaporator. The system of FIG. 4 includes helical member 11 mounted on shaft 12 and held in frame 14. The shaft is coupled to a rotary motion-to-heat transducer 24 such as a friction-loaded brake drum or the like, connected by a heat exchanger (not shown) to a sea water boiler 26. Also connected to shaft 12, preferably through suitable gearing is sea-water pump 28. The latter has a sea-water intake line 30 and serves to pump the sea water to valve 32 whence it may be diverted to fill boiler 26 or to traverse cooling coil 34 or both. Coil 34 surrounds distillation column 36 which is connected at one end to receive water vapor from boiler 26 and at the other end to discharge condensate into storage means 38. If desired, another pump can be coupled to shaft 12 to pump the fresh water from storage means 38. The system shown in FIG. 4 takes advantage of the immediate presence of the sea as a source of distillable water and as a coolant as well as a source of energy.

Figure 5:
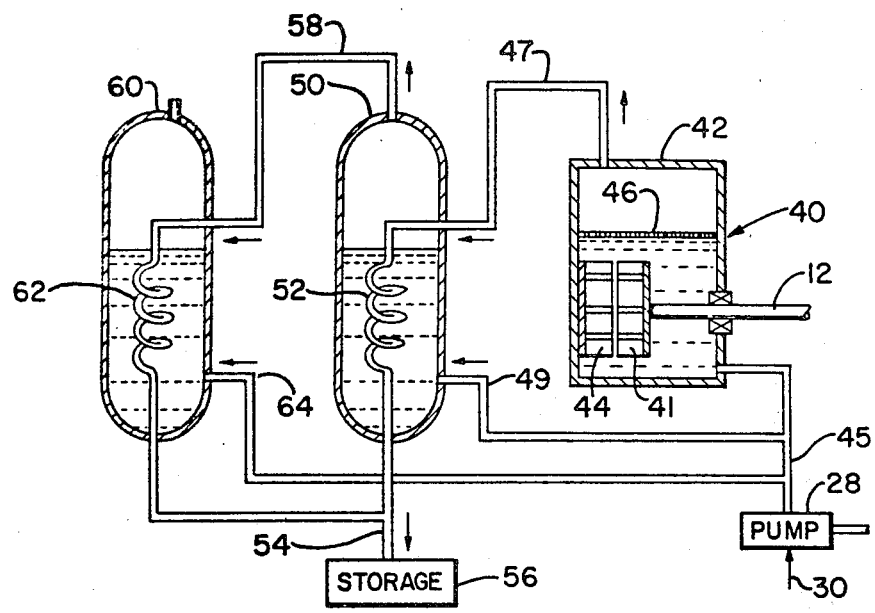
FIG. 5 is a schematic representation showing a second embodiment of a system for producing fresh water using the wave energy converter.

In FIG. 5, an embodiment of multistage evaporator (three stages being shown as exemplary) is shown schematically. As in the single-effect evaporator of FIG. 4, the multistage evaporator includes rotation-to-heat converter 40 which may comprise for example rotatable agitator 41. The latter is typically formed of a plurality of radially extended blades or vanes coupled either directly to the shaft 12, or through a gear train such as 18, so as to be rotatable by the helix of the wave converter. Agitator 41 is mounted for rotation within the interior of enclosure 42. Also mounted within the enclosure is static agitator which is typically a radially bladed device 44 facing agitator 41 and spaced from the latter by a short distance. Also connected to shaft 12, typically through suitable gearing, is sea water pump 28. The latter has sea water intake line 30 and serves to pump sea water into enclosure 42 through inlet line 45 coupled to enclosure 42 near the bottom of the latter. Preferably, at some intermediate point between agitator 41 and the top of enclosure 42 is antisplash screen 46. The upper volume in enclosure 42 above screen 46 is vented by connection to vapor output line 47.

It will be appreciated that the rotational energy-to-heat converter 40 thus described is essentially quite similar to the apparatus used by James P. Joule more than a century ago to determine the mechanical equivalent of heat. Such mechanical energy-to-heat converters are extremely efficient but surprisingly seem to have not found any practical usage heretofore. It is apparent that, in operation, agitator 41 is spun by rotation of shaft 12, and the rotary motion of the agitator is transmitted as a shearing force to sea water pumped into the lower portion of enclosure 42 by pump 28. The presence of static impeller 44 contributes to the distribution of the shear forces through the sea water so that the energy of rotation of agitator 41 serves to heat the sea water in the converter. As the sea water heats, the pressure of water vapor above the heated sea water rises, forcing heated water out through output line 47.

First evaporator stage 50 is a hollow vessel enclosing heating coil 52 which is connected at one end to receive water vapor from output line 47 and at the other end to discharge line 54 which conducts condensate to storage means 56. Input brine line 49 is connected to the output of pump 28 to conduct fresh sea water to evaporate 50. The top of evaporator 50 is vented by a connection to output vapor line 58.

Similarly, second evaporator 60 is a hollow vessel enclosing coil 62 which is connected at one end to receive water vapor from output line 58 and at the other end to discharge line 54. A brine input line 64 from pump 38 is connected to a lower portion of evaporator 60.

In operation it will be seen that the heated water vapor in line 47 is condensed in coil 52 and thence discharged as distilled water into storage means 56. Condensation occurs because the brine in evaporator 50 serves to cool coil 52, but in the process is of course itself heated raising the vapor pressure in the upper portion of evaporator 50. The warmed vapors conducted in along line 58 are thus cooled in coil 62 to form water which is led to storage 56. Thus the sea water in each stage is used to cool the vapors from the previous stage, i.e. the vapor from each stage is used to heat the brine of the next stage. The multistage evaporator is thus more efficient than the single effect evaporator in FIG. 4. Importantly, the system of FIG. 5 takes advantage of the immediate presence of the sea and as the source of the input energy which is converted to heat, as the source of distilled water and as the cooling medium.

Figure 6:
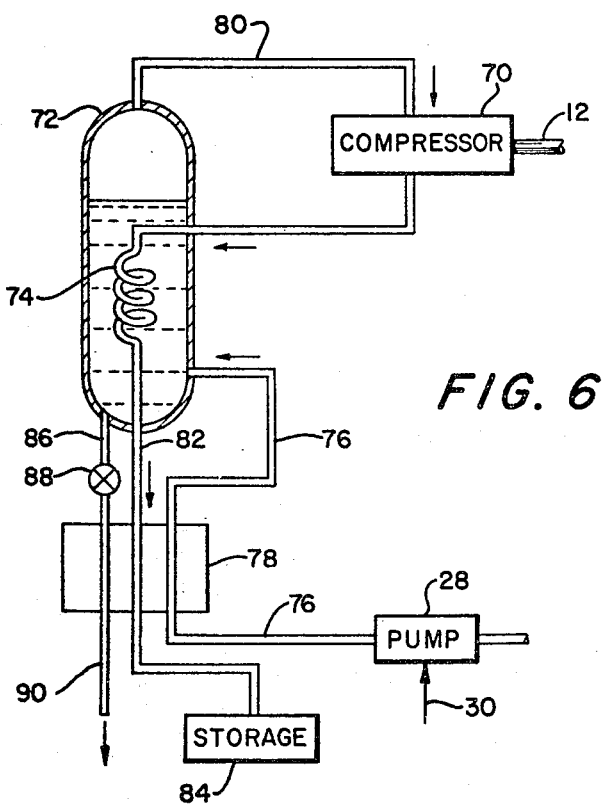
FIG. 6 is a schematic representation showing a third embodiment of a system for producing fresh water using the wave energy converter.

In FIG. 6, there is shown a schematic embodiment of a vapor compression evaporator to serve as system 16 in the embodiment of FIG. 1. In FIG. 6 there is provided a vapor pump or compressor 70 coupled to shaft 12 to be operated thereby. Similarly, sea water pump 28 is also coupled to shaft 12 preferably through suitable gearing. An evaporator 72 in the form of a hollow vessel is provided, and disposed within evaporator 72 is heating coil 74.

Pump 28 is provided with a sea water intake line 30 and output line 76 which traverses heat exchanger 78 and thence is connected to a lower portion of evaporator 72. The top of evaporator 72 is vented by connection to vapor output line 80 which is connected to the vapor input side of compressor 70. The output side of compressor 70 is connected to one end of coil 74. The other end of coil 74 is connected to output line 82 which also traverses heat exchanger 78 and is thence lead to storage means 84. Lastly, a bottom portion of evaporator 72, from the inlet point of line 76 is connected to output line 86 which leads to valve 88 and thence through heat exchanger 78 to discharge line 90.

In operation, as well known in the art, pump 28 partially fills evaporator 72 so that coil 74 is completely immersed in sea water but an open volume is left in evaporator 72 above the brine level. As compressor 70 compresses the water vapor above the brine in evaporator 72 the water vapor is heated so that the heated water vapor from compressor 70 when discharged through coil 74 serves to heat the brine in the evaporator. Of course the transfer of heat causes the water in the vapor to condense. The condensed water is lead through heat exchanger 78 where its heat content is further reduced by transfer to the cold sea water coming from pump 76. The cooled condensed water is thence lead to storage means 84. If the brine in evaporator 72 is heated, the vapor pressure of the water rises and causes more water to be distilled. It will be appreciated that this is also a very highly efficient system for converting the rotational energy fed into compressor 70 into heat which is used to effect distillation. Again, in the system of FIG. 6, advantage is taken of the immediate presence of the sea as a source of distilled water and a coolant as well as the energy source.

When the pitch of the helical member matches the wave length, the helical member is positioned with its axis parallel with the direction of wave travel. This can be accomplished by providing conventional moorings and securing the converter to the moorings by means such as lines 22. The converter may be oriented with either end located toward the source of the waves while housing 20 may be constructed so as to provide minimum interference with wave travel particularly when located toward the source of the waves as would be the case when the housing itself functions as the support for one end of the helical member. Additionally, housing 20 may be provided with suitable ballast, a keel or the like, to prevent axial rotation (capsizing) of the housing and/or to assist in predeterminedly orienting the converter with respect to the direction of the wave travel.

Another advantage of the movable wave energy converter of the invention manifests itself in the situation in which the wave length is less than the pitch of the helical member. In this case, the rotary axis of the helical member can be located at an angle with respect to the direction of wave travel such that the distance between wave crests, measured along the axis of the helix, is equal to the pitch of the helix. In this way, a wave energy converter having a helical member with a fixed pitch may be employed with waves having substantially shorter lengths.

While the wave converter shown and described is designed to float as a unit on the surface, other embodiments including fixed components are considered to fall within the scope of the invention. For example, the supporting truss 14 and/or the housing 20 for the driven power (torque) converter may be buoyed or supported independently of the helical member so that the latter is suspended at its ends at the proper height above the water surface. In embodiments of this type, the supporting truss 14 and/or housing 20 may be mounted so as to be movable only vertically as required to compensate for tide changes and/or variation in wave amplitude. For example, the helical member and/or driven power converter can be mounted on fixed structures mounted on the sea floor and providing for raising and lowering of the helical member as required to position it with a section immersed in the water, or removed it from the water to avoid storm damage. Such fixed structures preferably will also incorporated means for changing the axial direction of the helical member as necessitated by changes in wave direction and length.

The wave energy converter may be constructed essentially as shown, but with a plurality of helical members mounted on the same supporting frame in side-by-side, parallel relation.

It will be apparent from the foregoing description that the wave energy converter of the invention may never be required to withstand the full force of waves as in the case of wave energy converters which cause waves to break, utilize the energy of breaking waves or are located in region of breaking waves. For this reason and as a result of its mobility, the construction is relatively light and inexpensive as compared with structures which are immobile and, as a result, are subjected to and are designed to withstand severe wave conditions.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for manufacturing fresh water from wea water, said apparatus comprising in combination:
   means for containing a quantity of said sea water;
   means for converting the motion of gravity waves in sea water to heat so as to raise the temperature of said quantity of sea water with said heat, said conversion means comprising an elongated buoyant member curved about an axis to form a helix and means mounting said helical buoyant member for rotation about said axis, said mounting means including means for suspending said helican buoyant member so as to enable said member to float partially submerged with respect to the crests of said gravity waves;
   means couplable to said buoyant member for converting the rotation of the latter to heat energy;
   means for applying said heat energy to said quantity of sea water;
   condensing means; and
   means for collecting water vapor formed above the heated quantity of sea water and for directing said collected water vapor to said condensing means for condensation into a fresh water supply.

2. Apparatus as defined in claim 1 wherein said means couplable to said buoyant member comprises means for agitation said quantity of sea water to transmit the energy of said motion to said quantity of sea water.

3. Apparatus as defined in claim 1 wherein said means for converting further comprises a vapor compression evaporator including means for compressing said water vapor.

4. Apparatus as defined in claim 3 wherein said means for compressing is coupled to said buoyant member so as to be driven thereby in response to rotation of said member.

5. Apparatus as defined in claim 1 wherein said means for applying said heat energy further includes a liquid boiler thermally coupled to said means for converting the rotation of said buoyant member to heat energy.

6. Apparatus as defined in claim 5 including a liquid pump coupled to said bouyant member to be driven thereby, said pump being connected for pumping liquid at least into said boiler.

7. Apparatus as defined in claim 5 including a liquid pump coupled to said bouyant member to be driven thereby, said pump being connected for pumping liquid at least as a coolant for said condensing means.

8. Apparatus as defined in claim 1 wherein said means for converting the rotation of said buoyant member to heat energy comprises a friction brake immersed in said quantity of sea water and adapted to convert said rotation to frictional heat.

* * * * *